United States Patent
Matthews et al.

(10) Patent No.: US 9,444,357 B1
(45) Date of Patent: Sep. 13, 2016

(54) ACTIVE REDUCED VOLTAGE SWITCHING USING SECONDARY SWITCH

(71) Applicant: Power Integrations, Inc., San Jose, CA (US)

(72) Inventors: David Michael Hugh Matthews, Los Gatos, CA (US); Balu Balakrishnan, Saratoga, CA (US); Rajko Duvnjak, Kanata (CA); Roland Sylvere Saint-Pierre, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 20 days.

(21) Appl. No.: 14/682,986

(22) Filed: Apr. 9, 2015

(51) Int. Cl.
*H02M 3/335* (2006.01)
*G06F 1/32* (2006.01)

(52) U.S. Cl.
CPC ........ *H02M 3/33592* (2013.01); *G06F 1/3287* (2013.01); *G06F 1/3293* (2013.01); *G06F 1/3296* (2013.01); *H02M 3/3353* (2013.01)

(58) Field of Classification Search
CPC .................... H02M 3/33507; H02M 3/33523; H02M 3/335; H02M 3/33592; H02M 3/33515; H02M 3/156; H02M 2001/0009; H02M 3/33569; Y02B 70/1475; Y02B 20/346; Y02B 70/126; H05B 33/0815; H05B 33/0848
See application file for complete search history.

(56) References Cited

U.S. PATENT DOCUMENTS

| | | | | |
|---|---|---|---|---|
| 5,377,091 A | * | 12/1994 | Faulk | H02M 3/33569 363/21.16 |
| 5,455,757 A | * | 10/1995 | Nguyen | H02M 3/33569 363/20 |
| 2010/0110732 A1 | * | 5/2010 | Moyer | H02M 3/33592 363/19 |
| 2012/0299561 A1 | * | 11/2012 | Chen | H02M 3/33507 323/235 |
| 2013/0329462 A1 | * | 12/2013 | Duvnjak | H02M 3/33523 363/15 |
| 2014/0204625 A1 | | 7/2014 | Liu et al. | |

* cited by examiner

*Primary Examiner* — Adolf Berhane
*Assistant Examiner* — Henry Lee, III
(74) *Attorney, Agent, or Firm* — Blakely Sokoloff Taylor & Zafman LLP (57) ABSTRACT

A controller includes a primary controller and a secondary controller to control switching of a power switch and a secondary switch, respectively, coupled to an energy transfer element of a power converter. A first drive circuit is coupled to generate a first drive signal to enable a first ON section of the secondary drive signal after an ON section of the primary drive signal. A second drive circuit is coupled to generate a second drive signal to enable a second ON section of the secondary drive signal to store energy in the energy transfer element. The energy stored in the energy transfer element during the second ON section is coupled to reduce a switch voltage across the power switch prior to a next ON section of the primary drive signal. The secondary drive signal is generated in response to the first drive signal and the second drive signal.

42 Claims, 6 Drawing Sheets

T2 (592) and T5 (596) MAY BE DETERMINED BY WINDING SENSE (554) or IO SENSE (549) or T4 (594) OR COMBINATION OF THESE

ACTIVE REDUCED VOLTAGE SWITCHING USING SECONDARY SWITCH

BACKGROUND INFORMATION

1. Field of the Disclosure

The present invention relates generally to controlling a power converter. More specifically, examples of the present invention are related to controlling switch mode power converters.

2. Background

Electronic devices (such as cell phones, tablets, laptops, etc.) use power to operate. Switched mode power converters are commonly used due to their high efficiency, small size, and low weight to power many of today's electronics. Conventional wall sockets provide a high voltage alternating current. In a switching power converter, a high voltage alternating current (ac) input is converted to provide a well-regulated direct current (dc) output through an energy transfer element to a load. In operation, a switch is turned ON and OFF to provide the desired output by varying the duty cycle (typically the ratio of the on time of the switch to the total switching period), varying the switching frequency, or varying the number of on/off pulses per unit time of the switch in a switched mode power converter.

In general, switching the power switch of the switching power converter to provide the desired output results in switching losses due to turning the power switch ON and OFF. For instance, turn ON loss may occur in the power switch when the voltage across the power switch having a drain capacitance (e.g., the effective capacitance between the drain and source of the power switch), is non-zero when the power switch is turned ON. The energy stored (and dissipated) by the drain capacitance is proportional to the value of the drain capacitance and the square of the voltage across the drain capacitance. The non-zero voltage across the power switch may cause a spike in a switch current through the power switch due to the drain capacitance. The power dissipation during the turn ON may be reduced by decreasing the value of the drain capacitance.

Turn OFF loss in the power switch may occur due to the cross over time for the switch current to fall to zero and the switch voltage across the power switch to increase from zero. The speed at which the switch voltage increases from zero is partially determined by the value of the drain capacitance. The lower the drain capacitance, the faster the switch voltage increases from zero. However, the faster the switch voltage increases from zero, the greater the power dissipation during turn OFF because the turn OFF loss is a product of the instantaneous voltage and current during the crossover time. Thus, the turn OFF loss is also sometimes referred to as crossover loss. Power dissipation during turn OFF may be reduced by increasing the value of the drain capacitance such that the switch current has substantially fallen to zero before the switch voltage increases from zero which minimizes the crossover time and therefore the turn OFF loss. Consequently, there have been compromises between reducing turn ON losses and reducing turn OFF losses of the power switch.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For illustrative purposes, it is noted that the below description discusses a power converter may be used to provide output voltage and current to for the purposes of providing energy to a battery powered product. It is appreciated however that the present invention may be applied in general to any power converter.

In various examples described herein, reduction of switching losses of a power switch is realized by reducing the voltage across the power switch at the time it turns ON in accordance with the teachings of the present invention. Examples in accordance with the teachings of the present invention can indirectly be used to also reduce turn OFF losses in the power switch because the reduction in voltage across the switch at turn ON means that the capacitance across the switch no longer has an appreciable impact on turn ON losses. As a result, the capacitance across the power switch can be increased, which typically reduces turn OFF losses by reducing V×I cross over losses, without impacting turn ON loss. This reduction in turn ON and potentially turn OFF losses enables higher efficiency in for example a power conversion circuit in accordance with the teachings of the present invention.

Figure 1A:
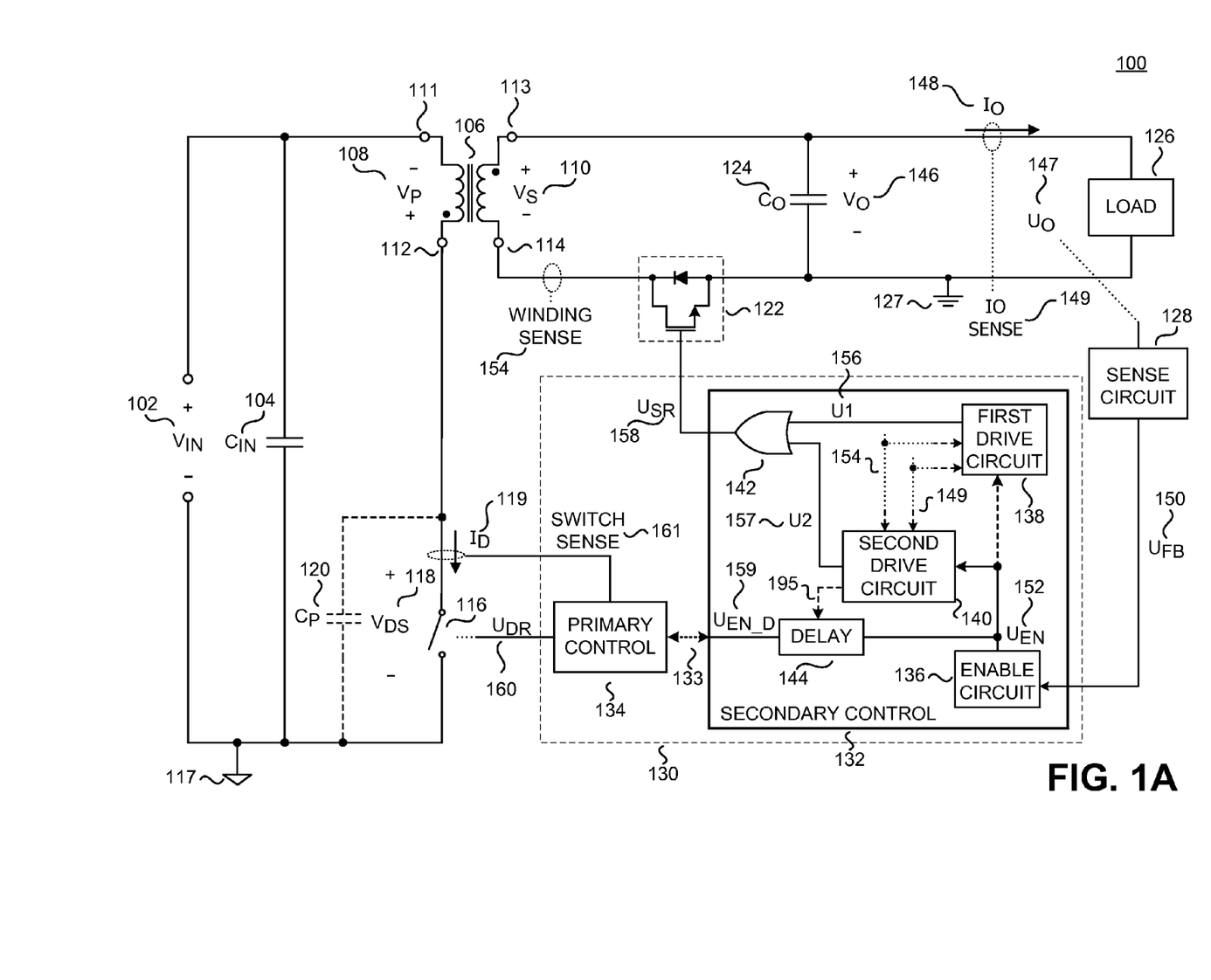
FIG. 1A illustrates one example of a power converter in a flyback configuration that utilizes a synchronous rectifier for output rectification in accordance with teachings of the present invention.

To illustrate, FIG. 1A illustrates one example of a power converter 100 in a flyback configuration that utilizes a synchronous rectifier 122, which may also be referred to as a secondary switch, for output rectification in accordance with teachings of the present invention. In one example, the power converter 100 may be used for example to provide energy to an electronic device, such as for example a battery powered product. It is appreciated however that power converter 100 may provide energy to other types of electronic devices. In addition, other topologies for the power converter 100 may also benefit from the teachings of the present invention. In the depicted example, the effective drain capacitance $C_P$ 120, which is illustrated in dashed lines, represents all the capacitance that is coupled across the power switch 116. The capacitance $C_P$ 120 may include the natural capacitance that is internal to the energy transfer element T1 106, as well as the natural internal capacitance of the power switch 116. The capacitance $C_P$ 120 may also represent discrete capacitors placed intentionally in various parts of the circuit to filter noise and to slow transitions of switching voltages.

In the illustrated example, power converter 100 also includes both a primary controller 134 and a secondary controller 132. Primary controller 134 controls the switching of the primary switch 116, while the secondary controller 132 controls the switching of the secondary switch 122. As mentioned above, the secondary switch 122 may be exemplified as a synchronous rectifier 122. The primary controller 134 and secondary controller 132 may communicate via communication link 133. In one example, primary controller 134 and secondary controller 132 may be formed as part of an integrated circuit that is manufactured as either a hybrid or monolithic integrated circuit, which is shown as controller 130. In one example the primary switch 116 may also be integrated in a single integrated circuit package with controller 130. In another example the secondary switch 122 may be integrated in a single integrated circuit package with controller 130. However, in another example, it should be appreciated that both the primary controller and the secondary controller need not be included in a single controller package, and for example may be implemented in separate controller packages. In addition, in one example, primary controller 134 and secondary controller 132 may be formed as separate integrated circuits.

Referring back to the example depicted in FIG. 1A, the secondary controller 132 is shown as including an enable circuit 136, a first drive circuit 138, a second drive circuit 140, a delay circuit 144, and an OR gate 142 that are coupled as illustrated. The enable circuit 136 receives the feedback signal $U_{FB}$ 150 representative of the output quantity $U_O$ 147, and outputs an enable signal $U_{EN}$ 152. The output quantity $U_O$ 147 may be representative of the output voltage $V_O$ 146 of the power converter 100, output current $I_O$ 148 of power converter 100, or both. The enable circuit 136 determines whether a switching cycle of the power converter 100 should be enabled. In other words, the enable circuit 136 determines whether the primary switch 116 should be enabled. In one example, the enable signal $U_{EN}$ 152 is a rectangular pulse waveform of logic high and logic low sections where a leading edge in the enable signal $U_{EN}$ 152 corresponds to enabling the primary switch 116 to turn ON.

In one example, first drive circuit 138 may output the first drive signal U1 156 in response to the enable signal 152, winding sense signal 154, and/or the output sense signal 149. In one example, the first drive signal U1 156 is output to control the turn ON and turn OFF of the synchronous rectifier 122. In one example, the first drive signal U1 156 is a rectangular pulse waveform with varying lengths of logic high and logic low sections. For the example shown in FIG. 1A, when the first drive signal U1 156 is logic high, the output of the OR gate 142, which is the secondary drive signal $U_{SR}$ 158, is also logic high and the secondary switch 122 (synchronous rectifier 122) is turned ON. In one example, the first drive circuit 138 is the main controller for the synchronous rectifier 122. For instance, in one example, the secondary switch 122 on the secondary side of power converter 100 is controlled to turn ON after the primary switch 116 is turned OFF such that energy stored in the energy transfer element 106 while the primary switch 116 is ON is transferred to the output of the power converter 100 (for example, transferred to the output capacitor $C_O$ 124 and the load 126). In this example, current in the secondary winding 110 is flowing in the direction of terminal 114 to terminal 113.

In operation, the secondary switch 122 (synchronous rectifier 122) is also utilized to reduce the switch voltage $V_{DS}$ 118 after a first turn ON of the secondary switch 122 and prior to a next turn ON of a power switch 116 in accordance with the teachings of the present invention. The second drive circuit 140 may control the secondary switch 122 to additionally turn ON prior to a next turn ON of a power switch 116. In one example, the switch voltage $V_{DS}$ 118 is reduced to substantially zero prior to a next turn ON of the power switch 116. Before turn ON of the power switch 116, the secondary switch 122 is turned ON to enable magnetic energy to be stored in the energy transfer element 106, with current through the secondary winding 110 of energy transfer element 106 flowing from terminal 113 to terminal 114. In one example, the secondary switch 122 is turned ON long enough such that the magnetic energy stored in the energy transfer element 106 is substantially equal to the energy stored across the drain capacitance $C_P$ 120. The turn ON of the secondary switch 122 to store magnetic energy is in addition to the main turn ON of the secondary switch 122 during normal operation in accordance with the teachings of the present invention.

In the example, once the secondary switch 122 is turned OFF after storing magnetic energy in the energy transfer element 106, the stored magnetic energy in the energy transfer element 106 generates a current flow in the primary winding 108 in the direction from terminal 112 to terminal 111, which depletes the energy stored across the drain capacitance $C_P$ 120 and reduces the switch voltage $V_{DS}$ 118 in accordance with the teachings of the present invention. In one example, the switch voltage $V_{DS}$ 118 is substantially reduced to zero. Therefore, there is very little switching loss during the turn ON of the power switch 116 since the switch voltage $V_{DS}$ 118 is substantially reduced to zero when the power switch 116 is turned ON. In addition, turn OFF losses of the power switch 116 may also be reduced. In particular, since the switch voltage $V_{DS}$ 118 is substantially reduced, the value of the effective drain capacitance $C_P$ 120 may be increased and the turn OFF losses of the power switch 116 may also be reduced accordingly.

Figure 5A:
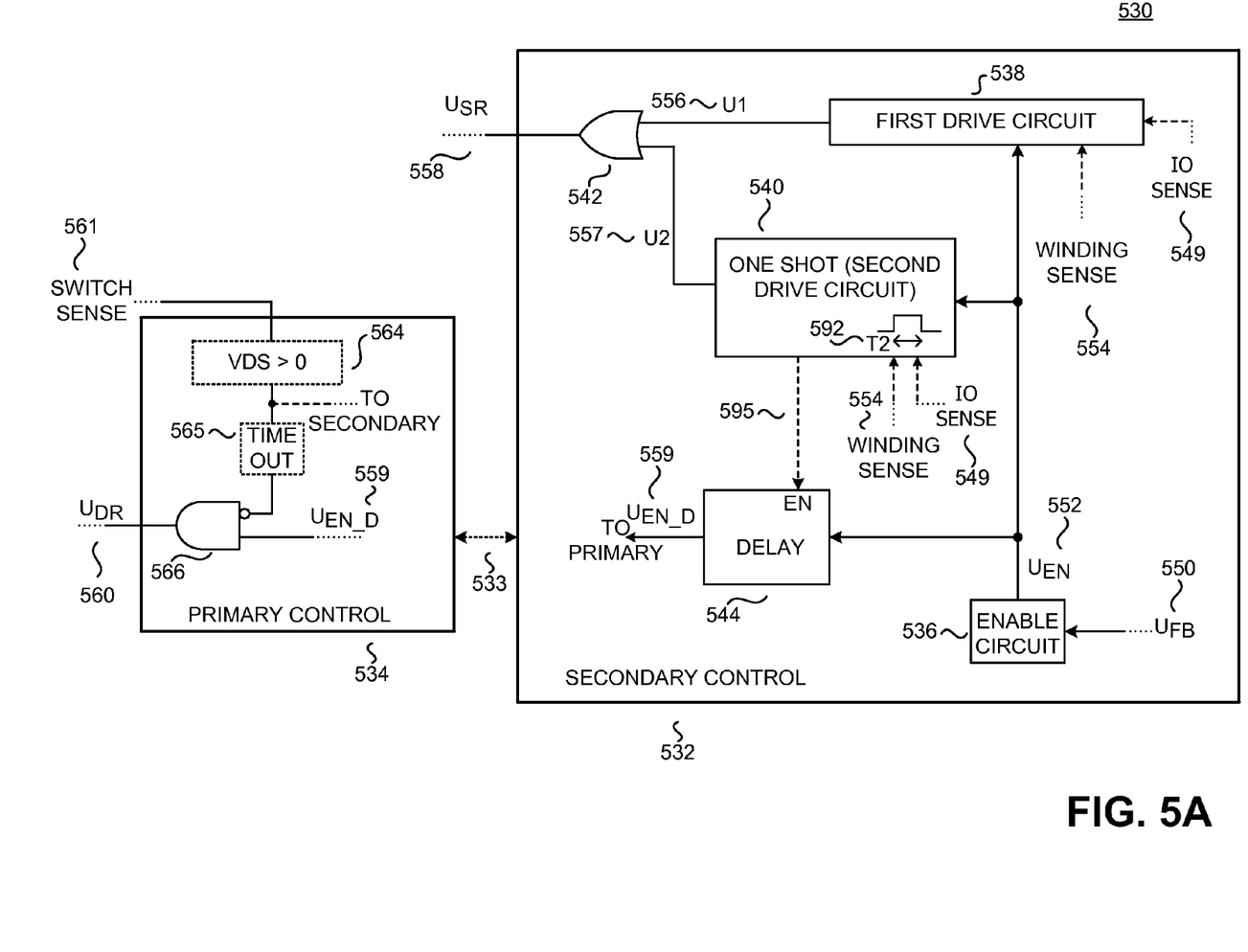
FIG. 5A is an example diagram that illustrates an example primary control and secondary control in accordance with teachings of the present invention.
Figure 5B:
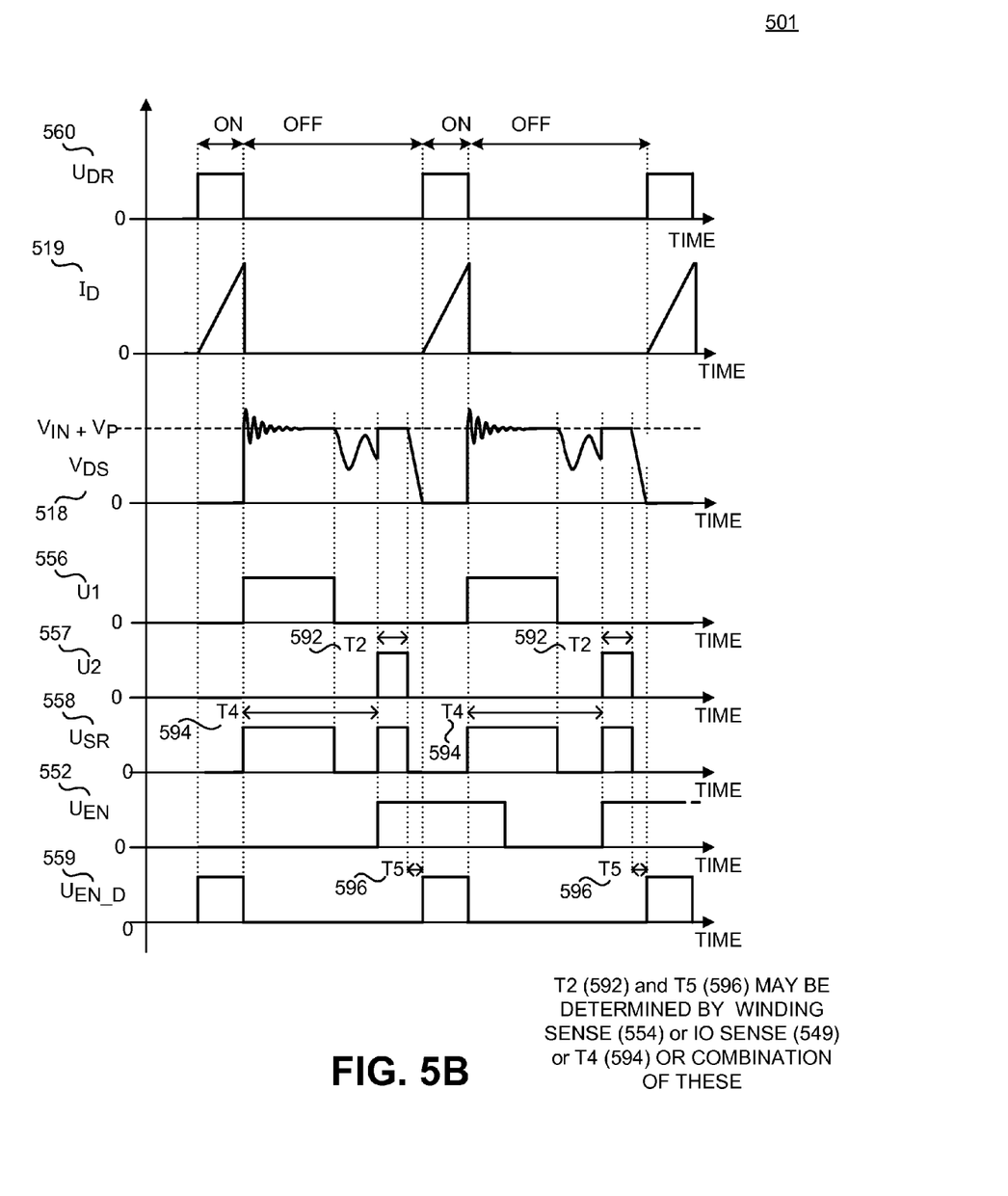
FIG. 5B shows an example timing diagram that illustrates example waveforms of a primary drive signal, a switch current, a switch voltage, and a secondary drive signal found in an example power converter in accordance with the teachings of the present invention.

In one example, the length of time which the secondary switch 122 is turned ON for storing magnetic energy, and discharging capacitive energy (e.g., time T2 592 in FIG. 5A and FIG. 5B) may be a function of the value of the output current $I_O$ 148, the input voltage $V_{IN}$ 102, or the length of time between the ON section of the primary drive signal 160 and the second ON section of the secondary drive signal 158 that follows (shown as length of time T4 594 in FIG. 5B). The input voltage $V_{IN}$ 102 may be sensed utilizing the voltage across the secondary winding (e.g., FWD pin 154 in FIG. 1B). As the input voltage $V_{IN}$ 102 increases, the time T2 592 may also increase and vice versa. As output current $I_O$ 148 decreases, the time T2 592 may increase and vice versa. In one example, the output current $I_O$ 148 may be low since it may have been some time since the last enabled switching cycle and some of the capacitances (e.g., a capacitance in a primary winding clamp or a bias winding capacitor) may have discharged. As such, it may take longer to store enough magnetic energy in the energy transfer element 106 to discharge the energy of the capacitance $C_P$ 120 when the output current $I_O$ 148 is low.

In one example, the primary controller 134 may also sense the switch voltage $V_{DS}$ 118 to delay the turn ON of the primary voltage $V_P$ 108 until the switch voltage $V_{DS}$ 118 is low. For example, once the secondary switch 122 is turned ON and turned OFF, the primary switch 116 can now turn ON. However, the power switch 116 is not turned ON until the sensed switch voltage $V_{DS}$ 118 by the primary controller 134 has fallen below a threshold.

As will be discussed, in one example, the primary controller 134 may also include a time out circuit along with the switch voltage $V_{DS}$ sense circuit (e.g., switch voltage sense circuit 564 in FIG. 5A), such that if the switch voltage $V_{DS}$ 118 doesn't fall below a threshold in a given amount of time, the power switch 116 is allowed to turn ON.

Figure 4:
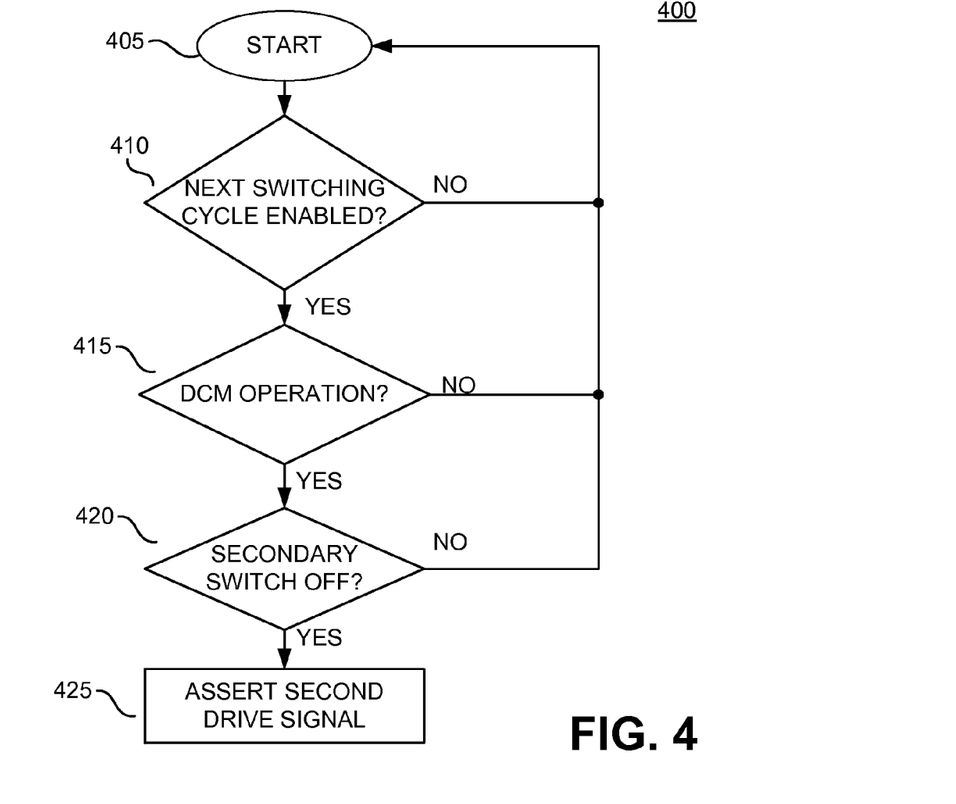
FIG. 4 illustrates a flow diagram of one example decision process of the second drive circuit in accordance with teachings of the present invention.

As shown in the example depicted in FIG. 1A, the enable signal $U_{EN}$ 152 that is output by enable circuit 136 is received by the second drive circuit 140 and the delay circuit 144. In one example, the second drive circuit 140 may determine to turn ON the secondary switch 122 in response to the enable signal $U_{EN}$ 152. The second drive circuit 140 may output the second drive signal U2 157 in response to the enable signal $U_{EN}$ 152. In one example, the second drive signal U2 157 is a rectangular pulse waveform with varying lengths of logic high and logic low sections. For the example shown in FIG. 1A, when the second drive signal U2 157 is logic high, the output of the OR gate 142, which is secondary drive signal $U_{SR}$ 158, is also logic high and the secondary switch 122 (synchronous rectifier 122) is turned ON. If the secondary control 132 determines that the next switching cycle of the primary switch 116 should be enabled, the second drive circuit 140 turns ON the synchronous rectifier 122. As will be discussed below, FIG. 4 illustrates one example of the decision process for the second drive circuit 140. In one example, the second drive circuit 140 asserts the second drive signal U2 157 if the next switching cycle of the primary switch 116 is enabled, the power converter is operating in discontinuous conduction mode (DCM), and the secondary switch 122 is already OFF, or in other words, the first drive signal U1 156 has already been de-asserted.

When the secondary switch 122 (synchronous rectifier 122) is turned ON due to the second drive circuit 140 and the second drive signal U2 157, current flows from terminal 113 to terminal 114 of the secondary winding 110. Magnetic energy is then stored in the energy transfer element 106 such that when the synchronous rectifier 122 is turned OFF, the energy stored in capacitance $C_P$ 120 causes a flow of current from terminal 112 to terminal 111, which reduces the switch voltage $V_{DS}$ 118 in accordance with the teachings of the present invention.

In one example, a leading edge in the enable signal $U_{EN}$ 152, which corresponds to enabling the primary switch 116 for the next switching cycle, may trigger the second drive circuit 140 to output a logic high value for the second drive signal U2 157 for a given amount of time (e.g., T2 592 in FIG. 5B). The amount of time (e.g., T2 592 in FIG. 5B) that the second drive signal U2 157 turns ON the synchronous rectifier 122 may be a fixed or a variable amount of time. In one example, the time (e.g., T2 592 in FIG. 5B) is long enough so that the magnetic energy that is stored in the energy transfer element 106 is substantially equal to the energy that is stored across the drain capacitance $C_P$ 120 in accordance with the teachings of the present invention. In one example, the length of time (e.g., T2 592 in FIG. 5B) may be responsive to the winding sense signal 154, which is representative of the input voltage $V_{IN}$ 102, the output current sense signal 149, which is representative of output current $I_O$ 148, or both. In one example, the length of time (e.g., T2 592 in FIG. 5B) increases as the input voltage $V_{IN}$ 102 increases. In another example, the length of time (e.g., T2 592 in FIG. 5B) increases as the output current $I_O$ 148 decreases. In another example, the length of time (e.g., T2 592 in FIG. 5B) increases as the length of time between the ON section of the primary drive signal and the following second ON section of the secondary drive signal increases (e.g., T4 594 in FIG. 5B).

As shown in the depicted example, the delay circuit 144 is coupled to receive the enable signal $U_{EN}$ 152 and may delay the enable signal $U_{EN}$ 152. As illustrated in the example shown in FIG. 1A, the output of the delay circuit 144 is referred to as the delayed enable signal $U_{EN\_D}$ 159. The length of delay (also referred to as the delay time) may be fixed or variable. In one example, the second drive circuit 140 may enable or disable the delay circuit 144. For example, if the second drive signal U2 157 is not asserted, the delay circuit 144 does not delay the enable signal $U_{EN}$ 152. However, if the second drive signal U2 157 is asserted, the delay circuit 144 prevents the enable signal $U_{EN}$ 152 from enabling the turn ON of the primary switch 116 until the secondary switch 122 is turned OFF and the switch voltage $V_{DS}$ 118 has been reduced in accordance with the teachings of the present invention. In the example shown, the delay circuit 144 may receive a signal 195 from the second drive circuit 140 which represents the delay time. The delay time of the delay circuit 144 may be a function of the length of time the second drive signal U2 157 is asserted (e.g. time T2 592 of FIG. 5B) and the length of time after the second drive signal U2 157 has been de-asserted (e.g. T5

596 in FIG. 5B). In other words, the length of time (e.g. T5 596 in FIG. 5B) may represent the amount of time for the switch voltage $V_{DS}$ 118 to fall to substantially zero. The length of time after the second drive signal U2 157 has been de-asserted (e.g. T5 596 in FIG. 5B) may be responsive to the winding sense signal 154 (representative of the input voltage $V_{IN}$ 102), the output current sense signal 149 (which is representative of output current $I_O$ 148), the length of time between the ON section of the primary drive signal and the following second ON section of the secondary drive signal (e.g., T4 594 in FIG. 5B), or a combination of the three. In one example, the length of time (e.g. T5 596 in FIG. 5B) increases as the input voltage $V_{IN}$ 102 increases. In another example, the length of time (e.g. T5 596 in FIG. 5B) increases as the output current $I_O$ 148 decreases. In a further example, the length of time (e.g. T5 596 in FIG. 5B) increases as the length of time between the ON section of the primary drive signal and the following second ON section of the secondary drive signal increases (e.g., T4 594 in FIG. 5B).

In the depicted example, the primary control 134 is illustrated as receiving the delayed enable signal $U_{EN\_D}$ 159, which may just be the enable signal $U_{EN}$ 152 if there is no delay, and outputs the primary drive signal $U_{DR}$ 160 to control switching of the power switch 116. In one example, the primary control 134 may also receive a switch sense signal 161, which may be representative of the switch current $I_D$ 119, the switch voltage $V_{DS}$ 118, or both.

Figure 1B:
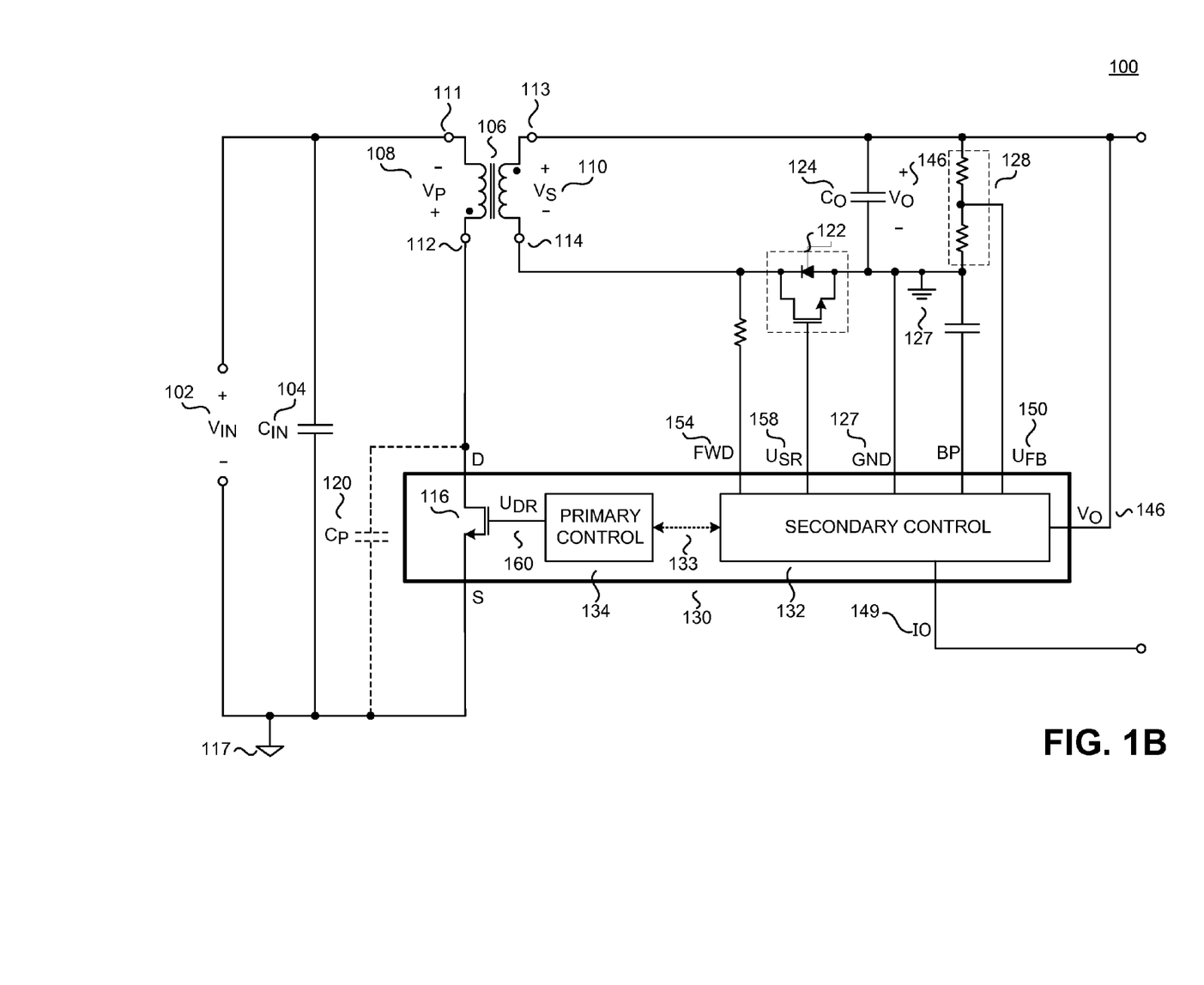
FIG. 1B illustrates another example of a power converter in a flyback configuration that utilizes a synchronous rectifier for output rectification in accordance with teachings of the present invention.

FIG. 1B illustrates another example of power converter 100 in accordance with teachings of the present invention. It is noted that power converter 100 of FIG. 1B may be another example of power converter 100 of FIG. 1A, and that similarly named and numbered elements referenced below are therefore coupled and function similar to as described above.

One difference between the example illustrated in FIG. 1B and the example illustrated in FIG. 1A is that the example illustrated in FIG. 1B shows different ways that certain signals, such as the FWD 154 signal, which is one example of the winding sense 154 signal can be sensed. As shown in the example depicted in FIG. 1B, the FWD 154 winding sense signal is received through a resistor coupled to terminal 114 of the secondary winding 110 of energy transfer element 106. The example depicted in FIG. 1B also illustrates a resistor divider that is coupled as shown to the output of power converter 100, and is utilized to implement a sense circuit 128 for power converter 100. In addition, the example depicted in FIG. 1B also illustrates that the power switch 116, the primary controller 134, and the secondary control 132 may all be included within the same package.

Figure 2:
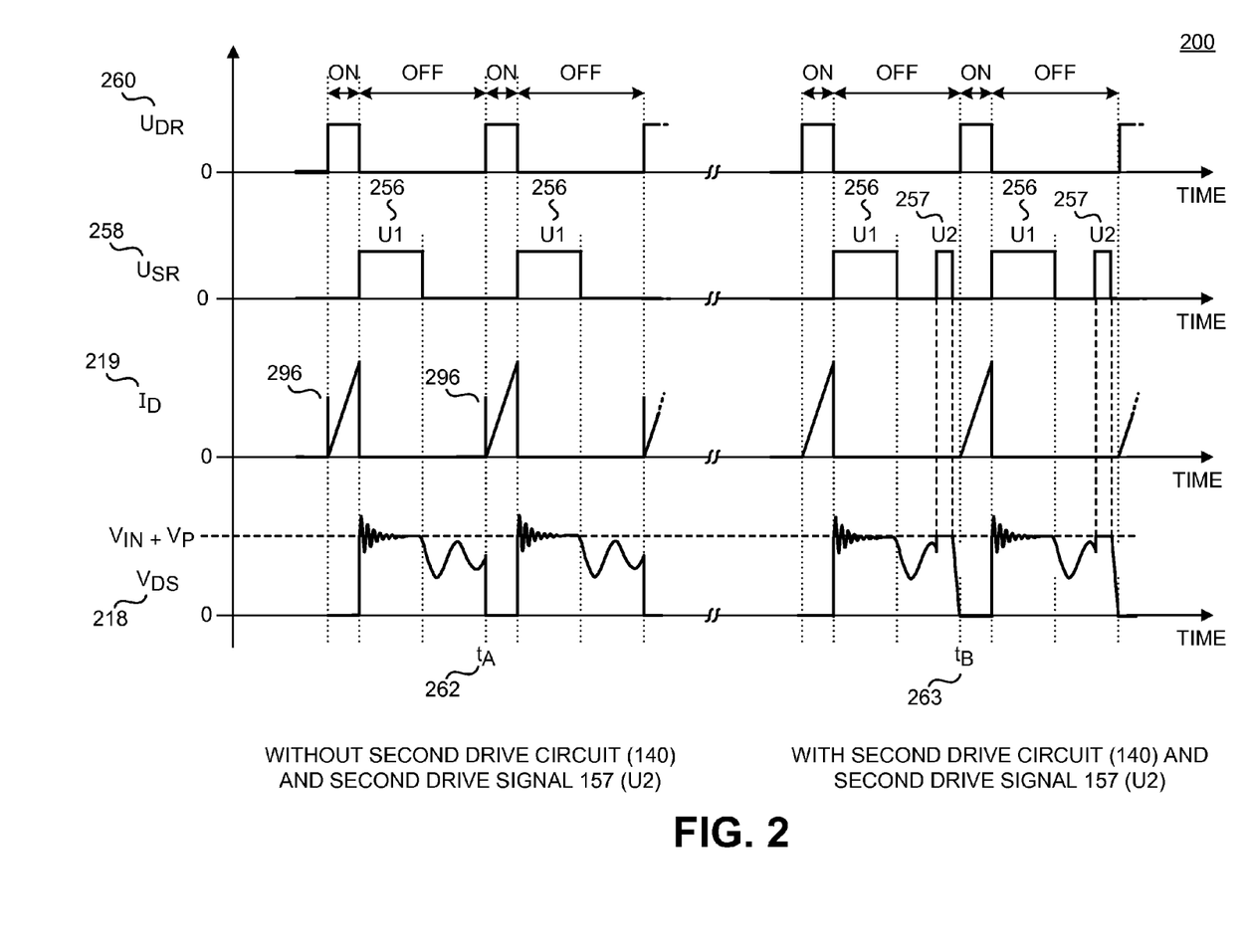
FIG. 2 shows an example timing diagram that illustrates example waveforms of a primary drive signal, secondary drive signal, a switch current, and a switch voltage found in an example power converter in accordance with the teachings of the present invention.

FIG. 2 shows an example timing diagram 200 that illustrates example waveforms of a primary drive signal $U_{DR}$ 260, secondary drive signal $U_{SR}$ 258, a switch current $I_D$ 219, and a switch voltage $V_{DS}$ 218 found in an example power converter, such as for example power converter 100 of FIGS. 1A-1B, in accordance with the teachings of the present invention. In the example, the waveforms on the left side of the page illustrate example waveforms of the switch current $I_D$ 219 and the switch voltage $V_{DS}$ 218 without the second drive circuit 140 and second drive signal U2 157, while the waveforms on the right side of the page illustrate example waveforms of the switch current $I_D$ 219 and the switch voltage $V_{DS}$ 218 with second drive circuit 140 and second drive signal U2 157 in accordance with the teachings of the present invention.

As shown, the primary drive signal $U_{DR}$ 260 includes ON sections separated by OFF sections. During ON sections of the primary drive signal $U_{DR}$ 260, the power switch 116 is turned ON and switch current through the primary winding of energy transfer element 106 increases the magnetically stored energy in energy transfer element 106. At the start of an OFF section after an ON section of the primary drive signal $U_{DR}$ 260, the primary drive signal $U_{DR}$ 260 transitions from a logic high to a logic low value, which turns OFF the power switch 116 and a first ON section begins and the secondary drive signal $U_{SR}$ 258 transitions from a logic low to logic high value. In the example, the first ON sections of the secondary drive signal $U_{SR}$ 258 are illustrated as corresponding to the first drive signal U1 256, which turn ON the secondary switch 122. In the example, when the secondary switch 122 is turned ON in response to the first ON section corresponding to the first drive signal U1 256, the magnetic energy stored in the energy transfer element 106 during the ON sections of the primary drive signal $U_{DR}$ 260 is transferred to the output of the power converter 100. As shown, the switch current $I_D$ 219 falls to zero, and the switch voltage $V_{DS}$ 218 increases from zero. The switch voltage $V_{DS}$ 218 rings and then settles to substantially the input voltage $V_{IN}$ plus the voltage on the primary winding $V_P$. At the end of the logic high section of the secondary drive signal $U_{SR}$, the switch voltage $V_{DS}$ 218 begins to decrease, however, due to the various inductances and capacitances in the power converter, the switch voltage $V_{DS}$ 218 also rings. This section may be referred to as the relaxation period.

For an example without the second drive circuit 140 and therefore without second drive signal U2 157, as shown on the left hand side of FIG. 2, at the beginning of each ON section of the primary drive signal $U_{DR}$ 260, which is when the primary drive signal $U_{DR}$ 260 transitions from a logic low to a logic high value, the primary switch 116 is turned ON while the switch voltage $V_{DS}$ 218 is substantially non-zero (shown at time $t_A$ 262). Consequently, the stored energy in the drain capacitance $C_P$ 120 is dissipated, and the switch current $I_D$ 219 suffers with current spikes 296 to a non-zero value at the beginning of an ON section of primary drive signal $U_{DR}$ 260. This is generally referred to as turn ON switching loss.

However with the addition of the second drive circuit 140 and second drive signal U2 157, as shown on the right hand side of FIG. 2, second ON sections occur in secondary drive signal $U_{SR}$ 258 after each ON section in primary drive signal $U_{DR}$ 260. The second ON sections of the secondary drive signal $U_{SR}$ 258 are illustrated as corresponding to the second drive signal pulses U2 257, which turn ON the secondary switch 122a second time between each ON section of the primary drive signal $U_{DR}$ 260. In the example, when the secondary switch 122 is turned ON for the second time after each ON section of primary drive signal $U_{DR}$ 260 in response to the second drive signal pulses U2 257, the switch voltage $V_{DS}$ 218 substantially increases to the input voltage $V_{IN}$ plus the voltage on the primary winding $V_P$ for the length of time the second drive signal U2 257 is logic high. It should be noted that in one example the initiation of time period U2 257 may be controlled to coincide substantially with a peak in the relaxation period waveform which will reduce the voltage across (and therefore energy loss in) the synchronous rectification FET 122 in FIG. 1 at the point where it turns on. In one example this control could be part of the function of second drive circuit 140 using information from winding sense input 154. During this time, the magnetic energy is stored in the energy transfer element 106. Once the second drive signal U2 257 transitions to a logic low value and the secondary switch 122 turns OFF, the switch voltage $V_{DS}$ 218 reduces in response to the magnetic energy that was stored the energy transfer element 106 during the second ON section of the secondary drive signal $U_{SR}$ 258 in response to the second drive signal U2 257. In the example shown in FIG. 2, the switch voltage $V_{DS}$ 218 reduces to zero (as shown at time $t_B$ 263). Thus, when the next ON section occurs in primary drive signal $U_{DR}$ 260, as shown with the transitions from a logic low to a logic high value, to turn on the power switch 116, the capacitance $C_P$ 120 is substantially discharged, and there is no spike in the switch current $I_D$ 219 in accordance with the teachings of the present invention. As such, turn ON switching losses may be reduced in accordance with the teachings of the present invention.

Figure 3:
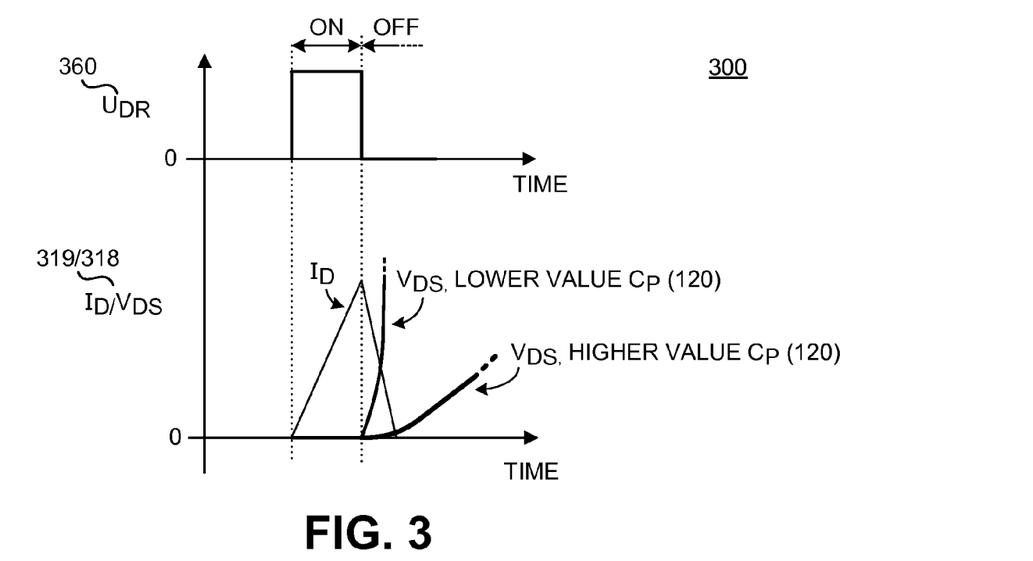
FIG. 3 illustrates an example timing diagram showing example waveforms of the primary drive signal, switch current, and switch voltage that illustrate the effects of the drain capacitance on the turn OFF losses in accordance with teachings of the present invention.

FIG. 3 illustrates an example timing diagram 300 showing example waveforms of the primary drive signal $U_{DR}$ 360, switch current $I_D$ 319, and switch voltage $V_{DS}$ 318, which illustrate the effects of the drain capacitance on the turn OFF losses found in an example power converter, such as for example power converter 100 of FIGS. 1A-1B, in accordance with the teachings of the present invention. It should be appreciated that the decay of the switch current $I_D$ 319 is exaggerated to better illustrate the crossover period. As shown in the depicted example, during the ON time of the power switch, which in the example occurs when primary drive signal $U_{DR}$ 360 is logic high, the switch current $I_D$ 319 increases. When the primary switch turns OFF, which in the example occurs as the primary drive signal $U_{DR}$ 360 transition from logic high to logic low, the switch current $I_D$ 319 decreases to substantially zero. The drain voltage $V_{DS}$ 318 begins to increase as well at this time when the primary switch turns OFF. The rate at which the drain voltage $V_{DS}$ 318 increases may be partially determined by the size of the drain capacitance $C_P$ 120. For instance, a lower value for the drain capacitance $C_P$ 120 may correspond to a faster increase in the drain voltage $V_{DS}$ 318. As shown in FIG. 3, when the drain capacitance $C_P$ 120 is lower, the amount of time which the drain voltage $V_{DS}$ 318 and switch current $I_D$ 319 overlap while $V_{DS}$ 318 is high is greater corresponding to greater turn OFF losses. As mentioned above, the switch voltage $V_{DS}$ 118 is substantially reduced due to the additional or second turn on of the synchronous rectifier. As a result, the value of the effective drain capacitance $C_P$ 120 may be increased, and the turn OFF losses of the power switch 116 may therefore be reduced in accordance with the teachings of the present invention.

FIG. 4 illustrates a flow diagram 400 of one example decision process of the second drive circuit, such as for example second drive circuit 140 of FIG. 1A, in accordance with teachings of the present invention. As illustrated, processing begins at process block 405. At process block 410, if the next switching cycle is enabled, processing moves on to process block 415. Otherwise, processing returns to process block 405. At process block 415, if the controller is operating in discontinuous conduction mode (DCM), processing moves on to process block 420. Otherwise processing returns to process block 405. At process block 420, if the secondary switch is also turned OFF, the second drive signal is asserted in process block 425.

FIG. 5A is an example diagram 530 that illustrates example primary control 534 and secondary control 532 in accordance with teachings of the present invention. It is noted that primary control 534 and secondary control 532 of FIG. 5A may be examples of primary control 134 and secondary control 132 of FIGS. 1A-1B, and that similarly named and numbered elements referenced below may therefore couple and function similar to as described above.

For instance, similar to the examples depicted in FIGS. 1A-1B, the first drive circuit 538 is shown as receiving the winding sense 554, output current $I_O$ sense 549, and enable signal $U_{EN}$ 552. In the depicted example, the second drive circuit 540 is shown as a monostable multivibrator, which may also be referred to as a one shot. The monostable multivibrator of second drive circuit 540 outputs the second drive signal U2 557 with a pulse having length T2 592 in response to a leading edge of the enable signal $U_{EN}$ 552. In one example, the length T2 592 of the pulse may be responsive to the winding sense signal 554, or the output current $I_O$ sense signal 549, or both. In the example, the length T2 592 increases with increasing input voltage $V_{IN}$. In the example, the length T2 592 also increases with decreasing output current $I_O$. In another example, the length T2 592 increases as the length of time between the ON section of the primary drive signal $U_{DR}$ 560 and the following second ON section (due to second drive signal U2 557) of the secondary drive signal $U_{SR}$ 558 increases. This length of time between the ON section of the primary drive signal $U_{DR}$ 560 and the following second ON section of the secondary drive signal $U_{SR}$ 558 is illustrated as time T4 594 in FIG. 5B.

In the example shown, the delay circuit 544 is coupled to receive the enable signal $U_{EN}$ 552 and may delay the enable signal $U_{EN}$ 552 and its output may be referred to as the delayed enable signal $U_{EN\_D}$ 559. The length of delay, referred to as the delay time, may be fixed or variable. In one example, the second drive signal U2 557 may enable or disable the delay circuit 544 (as illustrated by signal 595 in dashed lines). If the second drive signal U2 557 is not asserted, the delay circuit 544 does not delay the enable signal $U_{EN}$ 552. However, if the second drive signal U2 557 is asserted, the delay circuit 544 prevents the enable signal $U_{EN}$ 552 from enabling the turn ON of the primary switch until the synchronous rectifier is turned OFF. Further, the delay circuit 544 may prevent the turn ON of the primary switch until the switch voltage $V_{DS}$ 118 has been reduced in accordance with the teachings of the present invention. In the example shown, the delay circuit 544 may receive a signal 595 which represents the delay time from the second drive circuit 540. The delay time of the delay circuit 544 may be a function of the length of the second drive signal U2 557 is asserted time (e.g. time T2 592 of FIG. 5B) and the length of time after the second drive signal U2 557 has been de-asserted (e.g. T5 596 in FIG. 5B). The length of time after the second drive signal U2 557 has been de-asserted (e.g. T5 596 in FIG. 5B) may be responsive to the winding sense signal 554 (representative of the input voltage $V_{IN}$), the output current sense signal 549 (which is representative of output current $I_O$), the length of time between the ON section of the primary drive signal and the following second ON section of the secondary drive signal (e.g., T4 594 in FIG. 5B), or a combination of the three. In one example, the length of time (e.g. T5 596 in FIG. 5B) increases as the input voltage $V_{IN}$ increases. In another example, the length of time (e.g. T5 596 in FIG. 5B) increases as the output current $I_O$ decreases. In a further example, the length of time (e.g. T5 596 in FIG. 5B) increases as the length of time between the ON section of the primary drive signal and the following second ON section of the secondary drive signal increases (e.g., T4 594 in FIG. 5B).

In the depicted example, the primary controller 534 is shown as including a switch sense circuit 564, a time out circuit 565, and an AND gate 566. One input of the AND gate 566 has a small circle representing an inverter. The primary controller 534 is coupled to receive the delayed enable signal $U_{EN\_D}$ 559 from the secondary controller 532 via the communication link 533. In the depicted example, the switch sense circuit 564 receives a switch sense signal 561, and outputs a signal representative of whether the switch voltage $V_{DS}$ is greater than a threshold, which in one example may be zero. The output of the switch sense circuit 564 may be logic high when the switch voltage $V_{DS}$ is greater than the threshold. In one example, the value of the threshold may be selected to indicate that the switch voltage $V_{DS}$ is near zero.

In operation, the switch sense circuit 564 prevents the delayed enable signal $U_{EN\_D}$ 559 from turning on the primary switch when the switch voltage $V_{DS}$ is greater than the threshold. However, the primary control 534 may also include a time out circuit 565, such that if the switch voltage $V_{DS}$ does not fall below the threshold after a given amount of time, the time out circuit 565 outputs a logic low value and the delayed enable signal $U_{EN\_D}$ 559 may control switching of the primary switch.

The primary controller 534 may also send a signal to the secondary control 532 indicating if more or less energy should be stored in the energy transfer element 106 to reduce the switch voltage $V_{DS}$. Or in other words, the primary controller 534 may send a signal to the secondary control 532 indicating whether the length T2 592 of the second drive signal U2 557 should be increased or decreased. For example, if the switch voltage $V_{DS}$ doesn't fall below the threshold within a certain amount of time, the primary control 534 may send a signal to the secondary control 532 to increase the length T2 592 of the second drive signal U2 557.

FIG. 5B shows an example timing diagram 501 that illustrates example waveforms of a primary drive signal $U_{DR}$ 560, a switch current $I_D$ 519, a switch voltage $V_{DS}$ 518, a first drive signal U1 556, a second drive signal U2 557, a secondary drive signal $U_{SR}$ 558, an enable signal $U_{EN}$ 552, and a delayed enable signal $U_{EN\_D}$ 559, which are illustrated for example in the primary control 534 and secondary control 532 of FIG. 5A in accordance with the teachings of the present invention.

As shown, the drive signal $U_{DR}$ 560 turns on the power switch, which increases the switch current $I_D$ 519. In the example, the drive signal $U_{DR}$ 560 pulses occur concurrently with the delayed enable signal $U_{EN\_D}$ 559. At the start of an OFF section, the primary drive signal $U_{DR}$ 560 transitions from a logic high to a logic low value, and the secondary drive signal $U_{SR}$ 558 transitions from a logic low to logic high value, which corresponds to the first drive signal U1 556. The switch current $I_D$ 519 falls to zero, and the switch voltage $V_{DS}$ 518 increases from zero. The switch voltage $V_{DS}$ 518 rings and then settles to substantially the input voltage $V_{IN}$ plus the voltage on the primary winding $V_P$. At the end of the first logic high section of the secondary drive signal $U_{SR}$ 558 corresponding to the first drive signal U1 556, the switch voltage $V_{DS}$ 518 begins to decrease, however, due to the various inductances and capacitances in the power converter, the switch voltage $V_{DS}$ 518 rings. This may be referred to as the relaxation period.

When the next enable signal $U_{EN}$ 552 transitions from a logic low to a logic high value, the secondary drive signal $U_{SR}$ 558 also transitions to a logic high value for the length of time T2 592 as shown in accordance with the teachings of the present invention. In one example, the length of time T2 592 may be determined in response to the winding sense 554, the output current $I_O$ sense 549, or both. In another example, the length of time T2 592 may be determined in response to the winding sense 554, the length of time between the ON section of the primary drive signal $U_{DR}$ 560 and the following second ON section of the secondary drive signal $U_{SR}$ 558 (T4 594), or both. As a result of the secondary drive signal $U_{SR}$ 558 increasing to a logic high value for time T2 592, the synchronous rectifier turns ON, and magnetic energy is stored in the energy transfer element 106. Once the second drive signal U2 557 transitions to a logic low value and the synchronous rectifier turns OFF, the switch voltage $V_{DS}$ 518 reduces in response to the magnetic energy stored in the energy transfer element 106. In the example shown in FIG. 5B, the switch voltage $V_{DS}$ 518 reduces to zero. Thus, when the primary drive signal $U_{DR}$ 560 transitions from a logic low to a logic low high to turn on the power switch 116, the drain capacitance $C_P$ 120 is substantially discharged, and there is no spike in the switch current $I_D$ 519 in accordance with the teachings of the present invention. As such, turn ON switching losses may be reduced in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
a primary controller coupled to generate a primary drive signal to control switching of a power switch to control a transfer of energy from an input of the power converter to an energy transfer element of the power converter in response to an enable signal; and
a secondary controller coupled to generate a secondary drive signal to control switching of a secondary switch coupled to the energy transfer element, the secondary controller including:
an enable circuit coupled to receive a feedback signal representative of an output of the power converter, the enable circuit coupled to generate the enable signal in response to the feedback signal;
a first drive circuit coupled to generate a first drive signal to enable a first ON section of the secondary drive signal after an ON section of the primary drive signal to control a transfer of energy from the energy transfer element to the output of power converter; and
a second drive circuit coupled to generate a second drive signal to enable a second ON section of the secondary drive signal after the ON section of the primary drive signal to store energy in the energy transfer element, wherein the energy stored in the energy transfer element during the second ON section the secondary drive signal is coupled to reduce a switch voltage across the power switch after the second ON section of the secondary drive signal and prior to a next ON section of the primary drive signal, wherein the secondary drive signal is generated in response to the first drive signal and the second drive signal.

2. The controller of claim 1 wherein the energy stored in the energy transfer element during the second ON section of the secondary drive signal is further coupled to deplete energy stored across a drain capacitance across the power switch after the second ON section of the secondary drive signal and prior to a next ON section of the primary drive signal.

3. The controller of claim 2 wherein the energy stored in the energy transfer element during the second ON section of the secondary drive signal is substantially equal to energy stored in the drain capacitance across the power switch.

4. The controller of claim 1 wherein the first drive circuit is coupled to generate the first drive signal in response to one or more of an input voltage of the power converter and an output current of the power converter.

5. The controller of claim 1 wherein the primary controller is coupled to receive the enable signal from the enable circuit through a communication link, wherein the primary controller is coupled to generate the primary drive signal in response to the enable signal.

6. The controller of claim 1 wherein the second drive circuit comprises a monostable multivibrator circuit.

7. The controller of claim 1 wherein a length of time of the second ON section of the secondary drive signal is proportional to at least one of an output current of the power converter and an input voltage of the power converter.

8. The controller of claim 7 wherein the length of time of the second ON section of the secondary drive signal is coupled to increase in response to an increase in the input voltage of the power converter.

9. The controller of claim 7 wherein the length of time of the second ON section of the secondary drive signal is coupled to increase in response to a decrease in the output current of the power converter.

10. The controller of claim 1 wherein a length of time of the second ON section of the secondary drive signal is coupled to increase in response to an increase in a length of time between the ON section of the primary drive signal and the following second ON section of the secondary drive signal.

11. The controller of claim 1 wherein the secondary controller further includes a delay circuit coupled to receive the enable signal to delay the enable signal.

12. The controller of claim 11 wherein the delay circuit is coupled to delay the enable signal from enabling the power switch until the secondary switch is turned OFF and the switch voltage across the power switch is reduced.

13. The controller of claim 11, wherein a delay time of the delay circuit is proportional to at least one of an output current of the power converter and an input voltage of the power converter.

14. The controller of claim 13 wherein the delay time is coupled to increase in response to an increase in the input voltage of the power converter.

15. The controller of claim 13 wherein the delay time is coupled to increase in response to a decrease in the output current of the power converter.

16. The controller of claim 11 wherein a delay time of the delay circuit increases in response to an increase in a length of time between the ON section of the primary drive signal and the following second ON section of the secondary drive signal.

17. The controller of claim 1 wherein the primary controller is further coupled to generate the primary drive signal in response to the switch voltage across the power switch.

18. The controller of claim 1 wherein the primary controller is further coupled to generate the primary drive signal in response to the switch voltage across the power switch not falling below a threshold in a fixed time.

19. The controller of claim 1 wherein the primary controller and the secondary controller are included in a monolithic integrated circuit.

20. The controller of claim 1 wherein the primary controller and the secondary controller are included in a single integrated circuit package.

21. The controller of claim 1 wherein the second drive circuit enables the second ON section substantially at a peak in a relaxation period of the switch voltage of the power switch.

22. A power converter, comprising:
an energy transfer element having a primary winding and a secondary winding;
a power switch coupled to the primary winding and coupled to an input of the power converter;
a primary controller coupled to generate a primary drive signal to control switching of the power switch to control a transfer of energy from the input of the power converter to the energy transfer element in response to an enable signal; and
a secondary controller coupled to generate a secondary drive signal to control switching of a secondary switch coupled to the secondary winding, the secondary controller including:
an enable circuit coupled to receive a feedback signal representative of the output of the power converter, the enable circuit coupled to generate the enable signal in response to the feedback signal;
a first drive circuit coupled to generate a first drive signal to enable a first ON section of the secondary drive signal after an ON section of the primary drive signal to control a transfer of energy from the energy transfer element to the output of power converter; and
a second drive circuit coupled to generate a second drive signal to enable a second ON section of the secondary drive signal after the ON section of the primary drive signal to store energy in the energy transfer element, wherein the energy stored in the energy transfer element during the second ON section the secondary drive signal is coupled to reduce a switch voltage across the power switch after the second ON section of the secondary drive signal and prior to a next ON section of the primary drive signal, wherein the secondary drive signal is generated in response to the first drive signal and the second drive signal.

23. The power converter of claim 22 wherein the energy stored in the energy transfer element during the second ON section the secondary drive signal is further coupled to deplete energy stored across a drain capacitance across the power switch after the second ON section of the secondary drive signal and prior to a next ON section of the primary drive signal.

24. The power converter of claim 23 wherein the energy in the energy transfer element during the second ON section of the secondary drive signal is substantially equal to energy stored in the drain capacitance across the power switch.

25. The power converter of claim 22 wherein the first drive circuit is coupled to generate the first drive signal in response to one or more of an input voltage of the power converter and an output current of the power converter.

26. The power converter of claim 22 wherein the primary controller is coupled to receive the enable signal from the enable circuit through a communication link, wherein the primary controller is coupled to generate the primary drive signal in response to the enable signal.

27. The power converter of claim 22 wherein the second drive circuit comprises a monostable multivibrator circuit.

28. The power converter of claim 22 wherein a length of time of the second ON section of the secondary drive signal is proportional to at least one of an output current of the power converter and an input voltage of the power converter.

29. The power converter of claim 28 wherein the length of time of the second ON section of the secondary drive signal is coupled to increase in response to an increase in the input voltage of the power converter.

30. The power converter of claim 28 wherein the length of time of the second ON section of the secondary drive signal is coupled to increase in response to a decrease in the output current of the power converter.

31. The power converter of claim 22 wherein a length of time of the second ON section of the secondary drive signal is coupled to increase in response to an increase in a length of time between the ON section of the primary drive signal and the following second ON section of the secondary drive signal.

32. The power converter of claim 22 wherein the secondary controller further includes a delay circuit coupled to receive the enable signal to delay the enable signal.

33. The power converter of claim 32 wherein the delay circuit is coupled to delay the enable signal from enabling the power switch until the secondary switch is turned OFF and the switch voltage across the power switch is reduced.

34. The power converter of claim 32 wherein a delay time of the delay circuit is proportional to at least one of an output current of the power converter and an input voltage of the power converter.

35. The power converter of claim 34 wherein the delay time is coupled to increase in response to an increase in the input voltage of the power converter.

36. The power converter of claim 34 wherein the delay time is coupled to increase in response to a decrease in the output current of the power converter.

37. The power converter of claim 32 wherein a delay time of the delay circuit increases in response to an increase in a length of time between the ON section of the primary drive signal and the following second ON section of the secondary drive signal.

38. The power converter of claim 22 wherein the primary controller is further coupled to generate the primary drive signal in response to the switch voltage across the power switch.

39. The power converter of claim 22 wherein the primary controller is further coupled to generate the primary drive signal in response to the switch voltage across the power switch not falling below a threshold in a fixed time.

40. The power converter of claim 22 wherein the primary controller and the secondary controller are included in a monolithic integrated circuit.

41. The power converter of claim 22 wherein the primary controller and the secondary controller are included in a single integrated circuit package.

42. The power converter of claim 22 wherein the second drive circuit enables the second ON section substantially at a peak in a relaxation period of the switch voltage of the power switch.

* * * * *